(12) United States Patent
Miyashita et al.

(10) Patent No.: US 7,547,403 B2
(45) Date of Patent: Jun. 16, 2009

(54) ELECTROCONDUCTIVE RESIN COMPOSITION

(75) Inventors: Takayuki Miyashita, Shizuoka (JP); Takashi Usami, Shizuoka (JP)

(73) Assignee: Polyplastics Co., Ltd., Tokyo (JP)

( * ) Notice: Subject to any disclaimer, the term of this patent is extended or adjusted under 35 U.S.C. 154(b) by 55 days.

(21) Appl. No.: 10/562,116

(22) PCT Filed: Jun. 30, 2004

(86) PCT No.: PCT/JP2004/009165

§ 371 (c)(1), (2), (4) Date: Dec. 23, 2005

(87) PCT Pub. No.: WO2005/003238

PCT Pub. Date: Jan. 13, 2005

(65) Prior Publication Data

US 2007/0123633 A1    May 31, 2007

(30) Foreign Application Priority Data

Jul. 2, 2003    (JP) .............................. 2003-270281

(51) Int. Cl.
*H01B 1/04* (2006.01)
*H01B 1/00* (2006.01)
*H01M 2/00* (2006.01)

(52) U.S. Cl. ........................ 252/502; 252/500; 252/511; 429/34; 264/136

(58) Field of Classification Search ................. 252/500, 252/502; 429/34; 264/136
See application file for complete search history.

(56) References Cited

U.S. PATENT DOCUMENTS 4,772,422 A    9/1988    Hijikata et al.
4,889,886 A    12/1989    Wada et al.

FOREIGN PATENT DOCUMENTS

| EP | 1 059 348 A1 | 12/2000 |
|---|---|---|
| JP | A 62-131067 | 6/1987 |
| JP | A 63-146959 | 6/1988 |
| JP | A 4-311758 | 11/1992 |
| JP | A 6-93173 | 4/1994 |
| JP | A 6-172619 | 6/1994 |
| JP | A 6-207083 | 7/1994 |
| JP | A 6271748 | 9/1994 |
| JP | A 7-18162 | 1/1995 |
| JP | H07-018162 | * 1/1995 |
| JP | A 11-354136 | 12/1999 |
| JP | 2000-17179 A | 1/2000 |
| JP | 2001-055493 | * 2/2001 |
| JP | A-55493 | 2/2001 |
| JP | A 2001 126744 | 5/2001 |
| JP | 2002-307427 A | 10/2002 |

* cited by examiner

*Primary Examiner*—Mark Kopec
*Assistant Examiner*—Jaison P Thomas
(74) *Attorney, Agent, or Firm*—Buchanan Ingersoll & Rooney PC

(57) ABSTRACT

To provide a resin material excellent in electric conductivity and judiciously usable in the manufacture of fuel cell separators and so forth. An electroconductive resin composition which comprises 100 parts by weight of a liquid-crystalline polymer (A) and 200 to 500 parts by weight of at least one species of graphite (B) selected from synthetic graphite, flake graphite and amorphous graphite with a fixed carbon content of not less than 95% by weight and an average particle size of 50 to 200 μm as incorporated in the polymer, the composition resulting from melt-kneading under such conditions that the ratio Q/N, where Q (kg) is the hourly extrusion throughput rate during kneading and N (rpm) is the screw revolution rate, may amount to 0.1 to 1.5, the composition having a volume resistivity of not more than $2\times10^{-2}$ Ω·cm.

20 Claims, No Drawings

ELECTROCONDUCTIVE RESIN COMPOSITION

TECHNICAL FIELD

The present invention relates to a crystalline polymer composition containing graphite and more specifically to an electroconductive liquid crystalline polymer composition which is suitably used for molding a fuel cell separator required to have electric conductivity.

BACKGROUND ART

For a fuel cell separator, there have been attempted a cutting from a graphite material, a molding of an electroconductive thermosetting resin composition, a molding of an electroconductive thermoplastic resin composition, and a metal product. However, the cutting from a graphite material has a problem of a high cost and low mass productivity; the molding of an electroconductive thermosetting resin composition has problems of a low mass productivity because of a long molding cycle, need for troublesome post-processing, such as removing flashes after molding, and then a lowered performance because of the elution of unreacted substances. Also, it is difficult for the molding of the conventional electroconductive thermoplastic resin composition to achieve compatibility between electric conductivity and fluidity. The metal product has problems of a deteriorated electrolyte membrane due to the elution of the metallic ions, and catalyst poisoning. To solve these problems, gold plating on the surface is attempted, but not practical because of a high cost.

On the other hand, a liquid-crystalline polymer, which is capable of forming an anisotropic molten phase, is known as a material which exhibits excellent dimensional accuracy, damping property, and fluidity as compared to other thermoplastics and rarely forms flash during molding. So far, taking the above advantages into consideration, the composition of a liquid crystalline polymer reinforced with a glass fiber has been widely employed as electronic parts. In recent years, the liquid crystalline polymer has been supplemented with an electroconductive filler to impart an electrical conductivity, in addition to the excellent fluidity.

For example, JP-A 62-131067 attempted to add an electroconductive carbon black to a liquid crystalline polymer in order to improve the electric conductivity. This method allows for improvement of the electric conductivity, but needs an increased amount of filled carbon black to have a volume resistivity of not more than $5 \times 10^{-2}$ $\Omega \cdot$cm. It is therefore too viscous and has difficulty in molding because the structure of such an electroconductive carbon black is developed. JP-A 6-207083 has then attempted to add graphite as an electroconductive filler to improve the antistatic property. It is, however, difficult with this method to impart a necessary electric conductivity to a fuel cell separator. Moreover, JP-A 63-146959, JP-A 4-311758, JP-A 6-93173, JP-A 6-172619, JP-A 6-271748, and JP-A 7-18162 have attempted to add a specified graphite and/or a pitch-based carbon fiber to enhance slidability. This method allows recognizable improvement of the slidability, but it is also difficult even with this method to impart a necessary electric conductivity to a fuel cell separator.

Further, JP-A 11-354136 has attempted to use expanded graphite having a particle size of not less than a specific value for the separator in order to improve the electric conductivity, gas permeability and the like. This method allows recognizable improvement of the electric conductivity, but it is difficult with this method to blend the expanded graphite with a thermoplastic resin because of a low bulk specific gravity of expanded graphite.

Furthermore, JP-A2001-126744 has attempted to use a coarse particle graphite having a specified particle size for the separator in order to improve the electric conductivity, the mechanical strength, the dimensional accuracy and the like. This method does not necessarily improve the electric conductivity and the mechanical strength depending on kneading conditions, instead raises problems of deterioration in fluidity, generation of gas due to degradation, a decrease in the mechanical strength, deterioration in moldability and the like due to unsatisfied kneading, Patent Document 1: JP-A 62-131067
Patent Document 2: JP-A 6-207083
Patent Document 3: JP-A 63-146959
Patent Document 4: JP-A 4-311758
Patent Document 5: JP-A 6-93173
Patent Document 6: JP-A 6-172619
Patent Document 7: JP-A 6-271748
Patent Document 8: JP-A 7-18162
Patent Document 9: JP-A 11-354136
Patent Document 10: JP-A 2001-126744

DISCLOSURE OF THE INVENTION

Problems to be Solved by the Invention

As described above, various attempts have been made with respect to the electroconductive resin composition used for a fuel cell separator, but there has not been found out a material which allows solution of all above problems.

Means for Solving the Problems

In consideration of above problems, the present inventors have searched for a material having an excellent property in electric conductivity and found that a specified amount of a specified graphite is added to a liquid crystalline polymer and they are kneaded under specified conditions to impart electric conductivity to the polymer without a significant decrease in fluidity, and eventually achieving the present invention.

The present invention provides an electroconductive resin composition having a volume resistivity of not more than $5 \times 10^{-2}$ $\Omega \cdot$cm, which includes 100 parts by weight of the (A) liquid-crystalline polymer and 200 to 500 parts by weight of (B) at least one species of graphite selected from synthetic graphite, flake graphite and amorphous graphite, having a fixed carbon content of not less than 95% by weight and an average particle size of 50 to 200 μm, and is prepared by melt-kneading under such a condition that a ratio Q/N may amount to 0.1 to 1.5, where Q (kg) is an hourly extrusion throughput rate during kneading and N (rpm) is a screw revolution rate.

BEST MODES FOR CARRYING OUT THE INVENTION

The present invention is hereinafter described in detail. The liquid crystalline polymer (A) used in the invention refers to a melt-processible polymer being capable of forming an optically anisotropic molten phase. The property of the anisotropic molten phase can be identified by means of an ordinary polarization-detecting method using a cross polarizer. More specifically, an identification of the anisotropic phase can be performed by observing a molten sample, put on a Leitz hot stage, at 40 times magnification under nitrogen atmosphere with a Leitz polarizing microscope. The liquid crystalline polymer which can be applied to the present invention usually transmits a polarized light, even in a molten stationary state at testing, between cross polarizers, thereby exhibiting anisotropy optically.

The (A) liquid crystalline polymer described above, which is not specifically limited, is preferably an aromatic polyester or an aromatic polyester amide, and polyester which partially contains the aromatic polyester or the aromatic polyester amide in the same molecular chain is within the scope of the liquid crystalline polymer. Those having an inherent viscosity (I.V.) of preferably at least about 2.0 dl/g, and more preferably 2.0 to 10.0 dl/g when they are dissolved in pentafluorophenol at 60° C. with a concentration of 0.1% by weight are used.

The aromatic polyester or the aromatic polyester amide which can be applied to the present invention as the (A) liquid crystalline polymer is preferably an aromatic polyester or an aromatic polyester amide containing at least one or more compounds selected from the group consisting of aromatic hydroxycarboxylic acid, aromatic hydroxyamine, and aromatic diamine as a constituent.

Cited more specifically are (1) a polyester principally including one or more species of aromatic hydroxycarboxylic acid and its derivatives; (2) a polyester principally including (a) one or more species of aromatic hydroxycarboxylic acid and its derivatives, (b) one or more species of aromatic dicarboxylic acid, alicyclic carboxylic acid, and their derivatives, and (c) at least one or more species of aromatic diol, alicyclic diol, aliphatic diol, and their derivatives; (3) a polyester amide principally including (a) one or more species of aromatic hydroxycarboxylic acid and its derivatives, (b) one or more species of aromatic hydroxyamine, aromatic diamine, and their derivatives, and (c) one or more species of aromatic dicarboxylic acid, alicyclic dicarboxylic acid, and their derivatives; and (4) a polyester amide principally including (a) one or more species of aromatic hydroxycarboxylic acid and its derivatives, (b) one or more species of aromatic hydroxyamine, aromatic diamine, and their derivatives, and (c) one or more species of aromatic dicarboxylic acid, alicyclic dicarboxylic acid, and their derivatives, (d) at least one or more species of aromatic diol, alicyclic diol, aliphatic diol, and their derivatives. Furthermore, a molecular weight controller may be used in combination with above constituents as needed.

Cited as preferable examples of specific compounds which constitute the (A) liquid crystalline polymer which can be applied to the present invention are: aromatic diol such as p-hydroxybenzoic acid, aromatic hydroxycarboxylic acids including 6-hydroxy-2-naphthoic acid, 2,6-dihydroxynaphtharene, 1,4-dihydroxynaphtharene, 4,4'-dihydroxybyphenil, hydroquinone, resorcin, and compounds expressed by general formulas (I) and (II) shown below; aromatic dicarboxylic acid such as terephthalic acid, isophthalic acid, 4,4'-diphenildicarboxylic acid, 2,6-naphthalenedicarboxylic acid, and compounds expressed by a general formula (III) shown below; and aromatic amines such as p-aminophenol, and p-phenylenediamine.

[Chemical formula 1]

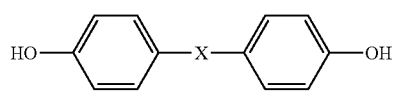
(I)

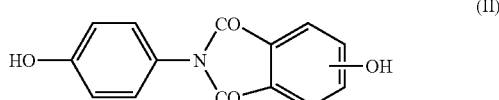
(II)

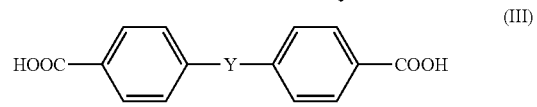
(III)

where X is a group selected from alkylene (C1 to C4), alkylidene, —O—, —SO—, —SO$_2$—, —S—, —CO—, and Y is a group selected from —(CH$_2$)$_n$-(n=1 to 4), —O(CH$_2$)$_n$O—(n=1 to 4).

A more preferable liquid crystalline polymer which is applied to the present invention is an aromatic polyester containing p-hydroxybenzoic acid, and 6-hydroxy-2-naphthoic acid as the main structural unit component.

To attain the electric conductivity for the purpose of the present invention, it is necessary to add 200 to 500 parts by weight of (B) graphite having a fixed carbon content of not less than 95% by weight and an average particle size of 50 to 200 μm to 100 parts by weight of the (A) liquid crystal line polymer, followed by melt-kneading under such a condition that a ratio Q/N may amount to 0.1 to 1.5, where Q (kg) is an hourly extrusion throughput rate during kneading and N (rpm) is a screw revolution rate.

The condition for melt-kneading is important in the present invention, and when the Q/N described above is less than 0.1, a shearing stress is applied for a long period of time, whereby the particles of the graphite are seriously broken so that problems, such as a decrease in electric conductivity, a generation of gas due to degradation, and a deterioration in fluidity and moldability due to an increase in viscosity, are caused. In addition, by contraries, when the Q/N is larger than 1.5, a decomposition of the resin becomes remarkable due to insufficient kneading and shear heat so that a decrease in the mechanical strength of the molding, and deterioration in moldability are caused.

Here, the upper limit of an extrusion throughput rate Q changes and depends on the size of the screw diameter of an extruder. As a screw diameter size becomes larger, the upper limit of Q value also becomes so larger. Therefore, it is practically difficult to set the screw revolution rate N after setting the Q so that the Q/N value may amount to 0.1 to 1.5. Therefore, it is practical to first set the screw revolution rate N of 50 to 500 (rpm), preferably 100 to 300 (rpm), and then to set the extrusion throughput rate Q such that the Q/N value may amount to 0.1 to 1.5. The temperature of the resin during kneading is preferably set to 330 to 360° C., which is higher than that in a usual extrusion kneading, from a viewpoint of an extrudability.

Moreover, in the present invention, the melt viscosity of the (A) liquid-crystalline polymer is important. A high melt viscosity causes breakage of the graphite particles due to a shearing stress during kneading, resulting in a decrease in electric conductivity and deterioration in molding-fluidity due to the increased viscosity. Thus, it is preferable to use the liquid crystalline polymer having a melt viscosity of not higher than 10 Pa·s, preferably not higher than 5 Pa·s at a measuring temperature of 10° C. plus the melting point.

In the present invention, one or more species of synthetic graphite, flake graphite and amorphous graphite, being a natural graphite, are used as the (B) graphite, and it is necessary to use graphite having a fixed carbon content of not less than 95% by weight, preferably not less than 98% by weight to attain a volume resistivity of not more than $5\times10^{-2}$ Ω·cm, especially not more than $2\times10^{-2}$ Ω·cm. The synthetic graphite having a higher fixed carbon content among them all is preferable from a viewpoint of performance. Graphite having a low bulk specific gravity such as expanded graphite is not preferable for use in the present invention because it is extremely bad in extrusion and is difficult to add at a high content. In this point, graphite preferable for use in the present invention has at least a bulk specific gravity of not less than 0.2.

To attain a volume resistivity of not more than $5\times10^{-2}$ Ω·cm in the present invention, the average particle size and the amount of (B) graphite to add are important, and when the average particle size is too small, a large amount to add is required to develop a desired electric conductivity, and thus deteriorates fluidity during molding, and by contraries, when the particle size is too large, a desired electric conductivity is developed, but pin holes are formed in a molding, causing a problem of the penetration of gas when the molding is used as a fuel cell separator. Therefore, it is necessary to use graphite having an average particle size of 50 to 200 μm, preferably 100 to 150 μm. A small amount of (B) graphite to add does not allow for a desired electric conductivity, and too large amount to add deteriorates extrudability and moldability. Thus, the amount to add should be within the range between 200 and 500 parts by weight, preferably 300 and 400, with respect to 100 parts by weight of the (A) liquid crystalline polymer.

Furthermore, the melt viscosity of a resin composition obtained after graphite is added is important in the present invention, and a high melt viscosity deteriorates molding fluidity. Therefore, the resin composition, which is melt at a molding temperature of 300 to 350° C., has preferably a melt viscosity of not more than 500 Pa·s, more preferably not more than 350 Pa·s.

In addition, various types of fibrous or nonfibrous fillers can be added in the composition according to the present invention within the range of a dispensing amount that does not diminish a target electric conductivity.

As the fibrous filler, a glass fiber, a carbon fiber, a whisker, an inorganic fiber, a mineral fiber and the like can be used. As the whisker, a silicon nitride whisker, a silicon trinitride whisker, a basic magnesium sulfate whisker, a barium titanate whisker, a silicon carbide whisker, a boron whisker and the like can be used, and as the inorganic fiber, various types of fiber including a rock wool, zirconia, alumina silica, potassium titanate, barium titanate, titanium oxide, silicon carbide, alumina, silica, a blast-furnace slag and the like can be used, and as the mineral fiber, asbestos and the like can be used. The glass fiber and the carbon fiber of them all are preferable from a viewpoint of a performance.

The filler in plate, powder or nonfibrous form specifically includes: silicates such as talc, mica, kaolin, clay, vermiculite, calcium silicate, aluminum silicate, powdery feldspar, acid clay, agalmatolite clay, sericite, sillimanite, bentonite, glass flake, powdery slate and silane; carbonates such as calcium carbonate, chalk, barium carbonate, magnesium carbonate and dolomite; sulfates such as powdery barite, blanfix, precipitated calcium sulfate, calcined plaster or barium sulfate; hydroxydes such as alumina hydrate; oxides such as alumina, antimony oxide, magnesia, titan oxide, a zinc flower, silica, silica sand, quartz, white carbon and diatomaceous earth; sulfides suchas molybdenum disulfide; metal powder and the like.

Graphite and fillers which are used in the present invention can be used not only without any additive but also in combination with a surface treatment agent and a sizing agent which have been known and generally used.

The liquid crystalline polymer composition of the present invention may include in scope a composition having good properties by adding an additive such as a nucleating agent, a carbon black, a pigment such as an inorganic calcined pigment, an antioxidizing agent, a stabilizer, a plasticizer, a lubricant, a mold-releasing agent and a flame retardant to the liquid crystalline polymer composition.

The electroconductive resin composition according to the present invention attains an excellent electric conductivity by using a specified graphite without diminished moldability, and exhibits a higher performance under such a state that each filler is evenly dispersed, macroscopically evenly dispersed in a molding and microscopically flocculated.

EXAMPLES

The present invention is hereinafter specifically described with reference to the examples, but not limited to those examples. The measurement and test of physical properties in the examples were carried out by the following method.

(1) Volume resistivity

The surface of a φ 30 mm×2 t planar test piece was abraded on the front face by about 100 μm in depth with a waterproof abrasive paper (#1200). A carbon paper, the test piece, a carbon paper and an electrode were piled on a gold-plated electrode in this order, and applied with a load of 1 MPa to measure a resistance value between the electrodes by a four-terminal method. The value was subtracted with the resistance value of the carbon paper to calculate a volume resistivity. Five test pieces were averaged in volume resistivity.

(2) Melt Viscosity

The melt viscosities of a pellet were measured at five to six shear rates around $1000 \text{ sec}^{-1}$ by a melt viscosity measuring device (Capirograph 1B type manufactured by TOYO SEIKI KOGYO CO. LTD.). The data were used to determine an approximate line, on which a melt viscosity was then calculated at a shear rate of $1000 \text{ sec}^{-1}$. They were measured at 350° C.

(3) Moldability of a Thin Wall

Moldability for molding a thin wall molding under the condition described below was evaluated according to the standard described below.

○: No problem

Δ: Variation found in fluidity

×: Impossible to mold because of an increased viscosity or a large particle size Injection molding machine: J180EII-SP manufactured by The Japan Steel Works, LTD.

Test piece: 120 mm×120 mm×3 t planar plate

Set cylinder temperature: 350° C.

Temperature of a mold: 150° C.

Injection speed: 3 to 5 m/min

Dwell: 60 MPa

Examples 1 to 5 and Comparisons 1 to 7

A graphite shown in Tables 1 to 2 at a rate shown in Tables 1 to 2 and 100 parts by weight of the liquid crystalline polymer (Vectra made by Polyplastics Co. Ltd.) were side-feeded into the three types of twin extruders described below through their weight feeders, and then melt-knead at a set resin temperature of 350° C. to prepare a pellet. The pellet was used to prepare an above-described test piece by an injection molding machine, which was then evaluated to give a result shown in Table 1.

The extruders, the liquid crystalline polyesters, and the graphite used herein are described below in detail.

Extruder 1: TEX30α type (screw diameter: 32 mmφ) manufactured by The Japan Steel Works, LTD.

Extruder 2: TEX65HTC type (screw diameter: 65 mmφ) manufactured by The Japan Steel Works, LTD.

Extruder 3: PCM30 type (screw diameter: 30 mmφ) manufactured by Ikegai Tekko K.K.

Liquid crystalline polymer 1: VectraD950 made by Polyplastics Co, Ltd., Melting point 330° C., Melt viscosity (measured at 340° C.) 3 Pa·s.

Liquid crystalline polymer 2: VectraA950 made by Polyplastics Co, Ltd., Melting point 280° C., Melt viscosity (measured at 290° C.) 53 Pa·s.

Graphite 1: Synthetic graphite SGP-100 made by SEC CORPORATION LTD., Fixed carbon content 99.9% by weight, Average particle size 100 μm.

Graphite 2: Synthetic graphite SGP-50 made by SEC CORPORATION LTD., Fixed carbon content 99.9% by weight, Average particle size 50 μm.

Graphite 3: Synthetic graphite SGS-350 made by SEC CORPORATION LTD., Fixed carbon content 99.9% by weight, Average particle size 350 μm.

Graphite 4: Synthetic graphite HAG-15 made by Nippon Graphite Industries, Ltd., Fixed carbon content 98.8% by weight, Average particle size 22 μm.

Graphite 5: Expanded graphite EXP-P made by Nippon Graphite Industries, Ltd., Fixed carbon content 95.0% by weight, Average particle size 100 μm.

TABLE 1

| | Ex. 1 | Ex. 2 | Ex. 3 | Ex. 4 | Ex. 5 |
|---|---|---|---|---|---|
| Extruder | Extruder 1 | Extruder 1 | Extruder 1 | Extruder 2 | Extruder 2 |
| Q: Hourly extrusion throughput rate (kg) | 20 | 20 | 45 | 200 | 40 |
| N: Revolution rate of screws in extrusion (ppm) | 200 | 200 | 150 | 200 | 200 |
| Q/N | 0.1 | 0.1 | 0.3 | 1 | 0.2 |
| Liquid crystalline polymer 1 (parts by weight) | 100 | 100 | 100 | 100 | |
| Liquid crystalline polymer 2 (parts by weight) | | | | | 100 |
| Graphite 1 (parts by weight) | 400 | | 300 | 400 | 400 |
| Graphite 2 (parts by weight) | | 400 | | | |
| Graphite 3 (parts by weight) | | | | | |
| Graphite 4 (parts by weight) | | | | | |
| Graphite 5 (parts by weight) | | | | | |
| Thin wall moldability | ○ | Δ | ○ | ○ | Δ |
| Volume resistivity (Ω·cm) | $2.0 \times 10^{-2}$ | $4.6 \times 10^{-2}$ | $3.0 \times 10^{-2}$ | $2.2 \times 10^{-2}$ | $4.5 \times 10^{-2}$ |
| Melt viscosity of resin composition (Pa·s) (Measurement temperature: 350° C.) | 476 | 515 | 348 | 496 | 1130 |

TABLE 2

| | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|
| Extruder | Extruder 1 | Extruder 1 | Extruder 1 | Extruder 1 | Extruder 2 | Extruder 3 | Extruder 1 |
| Q: Hourly extrusion throughput rate (kg) | 20 | 20 | 20 | 20 | 360 | 12 | 20 |
| N: Revolution rate of screws in extrusion (ppm) | 200 | 200 | 200 | 200 | 200 | 250 | 200 |
| Q/N | 0.1 | 0.1 | 0.1 | 0.1 | 1.8 | 0.05 | 0.1 |
| Liquid crystalline polymer 1 (parts by weight) | 100 | 100 | 100 | 100 | 100 | 100 | 100 |
| Liquid crystalline polymer 2 (parts by weight) | | | | | | | |
| Graphite 1 (parts by weight) | | | 150 | 650 | 400 | 400 | |
| Graphite 2 (parts by weight) | | | | | | | |
| Graphite 3 (parts by weight) | 400 | | | | | | |
| Graphite 4 (parts by weight) | | 400 | | | | | |
| Graphite 5 (parts by weight) | | | | | | | 400 |
| Thin wall moldability | X | X | ○ | X | Δ | Δ | *4 |
| Volume resistivity (Ω·cm) | $1.8 \times 10^{-2}$ | $7.9 \times 10^{-2}$ | $2.1 \times 10^{0}$ | *1 | *1 | $2.2 \times 10^{-2}$ | *4 |
| Melt viscosity of resin composition (Pa·s) (Measurement temperature: 350° C.) | 355 | 1220 | 186 | *2 | *3 | *2 | *4 |

Notes:
*1: Not evaluated because of impossible molding;
2*: impossible to measure due to exceeded measurement limit of the machine;
3*: impossible to evaluate because of a large measurement variation;
4*: impossible to measure because of impossible kneading in the extruder

The invention claimed is:

1. An electroconductive resin composition which comprises 100 parts by weight of a liquid-crystalline polymer (A) and 200 to 500 parts by weight of at least one species of graphite (B) selected from the group consisting of synthetic graphite, flake graphite and amorphous graphite, having a fixed carbon content of not less than 95% by weight and an average particle size of 50 to 200 μm, as incorporated in said polymer, said composition resulting from melt-kneading under such conditions that the ratio Q/N, where Q (kg) is the hourly extrusion throughput rate during kneading and N (rpm) is the screw revolution rate, ay amount to 0.1 to 1.5, said composition having a volume resistivity of not more than $5\times10^{-2}$ Ω·cm.

2. The electroconductive resin composition according to claim 1, wherein the graphite (B) has an average particle size of 100 to 150 μm.

3. The electroconductive resin composition according to claim 1, wherein the graphite (B) is incorporated in an amount of 300 to 400 parts by weight per 100 parts by weight of the liquid-crystalline polymer (A).

4. The electroconductive resin composition according to claim 1, said composition having a volume resistivity of not more than $2\times10^{-2}$ Ω·cm.

5. The electroconductive resin composition according to claim 1, wherein the liquid-cystalline polymer (A) has a melt viscosity of not higher than 10 Pa·s at a temperature higher by 10° C. than the melting point thereof.

6. The electroconductive resin composition according to claim 1, wherein the melt viscosity of said electroconductive resin composition in a molten state at 300 to 350° C. is not higher than 500 Pa·s.

7. The electroconductive resin composition according to claim 1, said composition having a heat conductivity of not less than 5 W/m·K.

8. A method of preparing an electroconductive resin composition, which comprises incorporating 200 to 500 parts by weight of graphite (B) having a fixed carbon content of not less than 95% by weight and an average particle size of 50 to 200 μm into 100 parts by weight of a liquid-crystalline polymer (A) and melt-kneading the resulting composition using an extruder under such conditions that the ratio Q/N, where Q (kg) is the hourly extrusion throughput rate during kneading and N (rpm) is the screw revolution rate, may amount to 0.1 to 1.5.

9. A fuel cell separator made of the electroconductive resin composition according to claim 1.

10. The electroconductive resin composition according to claim 2, wherein the graphite (B) is incorporated in an amount of 300 to 400 parts by weight per 100 parts by weight of the liquid-crystalline polymer (A).

11. The electroconductive resin composition according to claim 2, said composition having a volume resistivity of not more than $2\times10^{-2}$ Ω·cm.

12. The electroconductive resin composition according to claim 3, said composition having a volume resistivity of not more than $2\times10^{-2}$ Ω·cm.

13. The electroconductive resin composition according to claim 2, wherein the liquid-crystalline polymer (A) has a melt viscosity of not higher than 10 Pa·s at a temperature higher by 10° C. than the melting point thereof.

14. The electroconductive resin composition according to claim 3, wherein the liquid-crystalline polymer (A) has a melt viscosity of not higher than 10 Pa·s at a temperature higher by 10° C. than the melting point thereof.

15. The electroconductive resin composition according to claim 2, wherein the melt viscosity of said electroconductive resin composition in a molten state at 300 to 350° C. is not higher than 500 Pa·s.

16. The electroconductive resin composition according to claim 3, wherein the melt viscosity of said electroconductive resin composition in a molten state at 300 to 350° C. is not higher than 500 Pa·s.

17. The electroconductive resin composition according to claim 2, said composition having a heat conductivity of not less than 5 W/m·K.

18. The electroconductive resin composition according to claim 3, said composition having a heat conductivity of not less than 5 W/m·K.

19. A fuel cell separator made of the electroconductive resin composition according to claim 2.

20. A fuel cell separator made of the electroconductive resin composition according to claim 3.

* * * * *